United States Patent [19]
Ganz

[11] 3,818,286
[45] June 18, 1974

[54] ANODE FOR SOLID ELECTROLYTE CAPACITOR

[75] Inventor: Ernest D. Ganz, Palm Beach Gardens, Fla.

[73] Assignee: National Components Industries, Inc., West Palm Beach, Fla.

[22] Filed: Oct. 1, 1973

[21] Appl. No.: 401,976

Related U.S. Application Data

[63] Continuation of Ser. No. 238,844, March 28, 1972, abandoned.

[52] U.S. Cl. .............................................. 317/230
[51] Int. Cl.............................................. H01g 9/05
[58] Field of Search .................................. 317/230

[56] References Cited
UNITED STATES PATENTS

| 3,196,323 | 7/1965 | Rogers et al. | 317/230 |
| 3,345,545 | 10/1967 | Bourgault et al. | 317/230 |
| 3,688,161 | 8/1972 | Klein et al. | 317/230 |

Primary Examiner—Rudolph V. Rolinec
Assistant Examiner—William D. Larkins
Attorney, Agent, or Firm—Rudolph J. Jurick

[57] ABSTRACT

An anode for a solid electrolytic capacitor, said anode comprising a cylinder formed of two parts made of the same valve metal but having different densities.

7 Claims, 2 Drawing Figures

PATENTED JUN 18 1974　　　　　　3,818,286
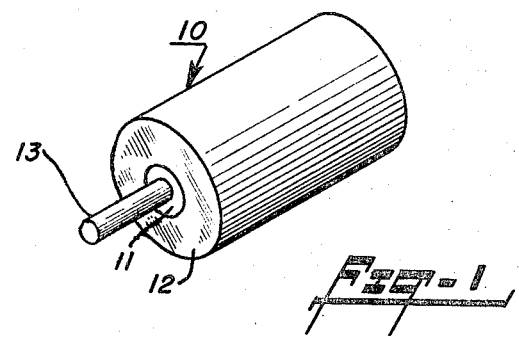
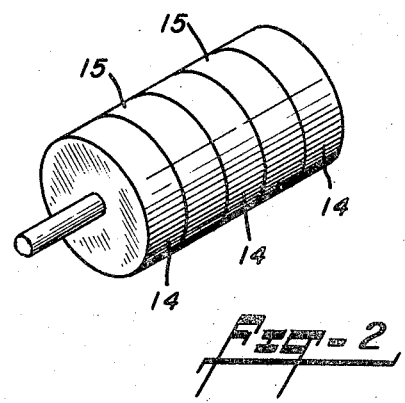

ANODE FOR SOLID ELECTROLYTE CAPACITOR

This is a continuation of my application Ser. No. 238,844, filed Mar. 28, 1972, now abandoned.

BACKGROUND OF THE INVENTION

Valve metal anodes have been made in various configurations for the purpose of providing capacitors having improved electrical and operating characteristics.

U.S. Pat. No. 3,345,545 issued Oct. 3, 1967 and entitled Solid Electrolytic Capacitor Having Minimum Anode Impedance, discloses anodes of various configurations. The anodes are provided with longitudinally-extending openings or channels for reducing the distance between any point within the anode and an external surface where contact to the electrolyte may be provided. This reduces the effects of electrolyte resistance within the anode, thereby providing a capacitor having an improved dissipation factor and capacitance stability. However, the voids formed in the anodes result in a reduced capacitance for an anode of given volumetric size.

An anode made in accordance with this invention has a reduced leakage current and a minimum impedance while, at the same time, providing a desirable increase in capacitance in an anode of a given volumetric size.

SUMMARY OF THE INVENTION

In one embodiment of the invention the anode comprises a cylindrical outer portion in intimate contact with a core portion, the two portions being made of the same valve metal but having different densities. In another embodiment of the invention, the anode comprises a plurality of layers of valve material, alternate layers having different densities.

An object of this invention is the provision of an improved anode made of a sintered valve material.

An object of this invention is the provision of an anode for a solid electrolyte capacitor, which anode has a lower leakage current, a minimum impedance and an increased capacitance for an anode of given volumetric size.

An object of this invention is the provision of an anode for a solid electrolyte capacitor, which anode comprises adjacently-disposed sections made of the same valve metal and having different densities.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views:

FIG. 1 is an isometric view showing an anode made in accordance with one embodiment of this invention; and FIG. 2 is an isometric view showing an anode made in accordance with another embodiment of this invention.

DESCRIPTION OF PREFERRED EMBODIMENTS

Referring to FIG. 1, the anode 10 is made of a suitable valve metal, preferably tantalum particles pressed and sintered by conventional powdered metallurgical techniques. The anode is made by first compressing and sintering tantalum particles to form the inner core portion 11. Tantalum particles are then pressed around the core to form the outer cylindrical shell 12 after which the sintering operation is repeated. A tantalum stem 13 may be formed integrally with the core. Alternatively, the stem may be welded to the sintered core. The two anode portions may be made of particles of the same size and the pressure employed to compress these portions into the individual configurations is such that the core has a lower density than the shell. On the other hand, the core may be formed of particles which are of a larger size than those used to make the shell. In either case, the core is more porous tan the shell, thereby affording easy access of the electrolyte to the inside of the total anode. By making the core of the same valve metal as the shell, the core adds to the overall capacitance of the anode, thereby providing a greater capacitance-volume ratio than in the case of an anode having a void formed therein. Also, the relatively small, initial mass of the core and the shell as compared to a solid, one-piece anode of the same overall mass, facilitates the removal of impurities from the material during the sintering operation.

In FIG. 2, the cylindrical anode comprises a plurality of discs 14 and 15, alternate discs having different densities. The individual discs may be compressed and sintered and then assembled into a stack, which stack is then subjected to a further sintering operation to form a unitory assemblage. Alternatively, the high density discs 14 may only be compressed into the disc shape and sintered after all of the discs have been assembled to form the stack. The low density discs 15 provide easy access of the electrolyte to the adjacently-disposed high density discs. Although the drawing illustrates an anode comprising five discs, it will be apparent that anode stack can be made of three or more discs, provided only that each disc of low density is positioned between two discs which have higher densities.

Having now described the invention, what I desire to protect by letters patent is set forth in the following claims.

I claim:

1. An anode for a solid electrolyte capacitor comprising,
   a. an outer portion formed of compressed, sintered particles of a valve metal and having a predetermined density, and
   b. an inner portion formed of compressed, sintered particles of the same valve metal and having a different predetermined density, said inner and outer portions being intimately united together and forming a cylinder.

2. The invention as recited in claim 1, wherein the said outer portion has the configuration of a cylinder with an axial hole extending therethrough, and wherein the said inner portion has the lower density and the configuration of a rod filling the said hole.

3. The invention as recited in claim 2, wherein the valve metal is tantalum.

4. The invention as recited in claim 2, wherein the said outer portion is made of particles of a smaller size than those of which the said inner portion is made.

5. The invention as recited in claim 1, wherein the said inner portion comprises a first disc; wherein the said outer portion comprises two discs in face contact with opposed faces of the first disc; and wherein the said two discs have higher densities than said first disc.

6. The invention as recited in claim 5, wherein the said valve metal is tantalum.

7. The invention as recited in claim 5, wherein the said first disc is made of particles having a larger size than those of which the said two discs are formed.

* * * * *